(12) United States Patent
Sweeney (10) Patent No.: US 11,803,464 B2
(45) Date of Patent: Oct. 31, 2023

(54) SYSTEM FOR AUTOMATIC IDENTIFICATION AND SELECTION OF OPTIMIZATION METRICS AND ACCOMPANYING MODELS IN EXPERIMENTATION PLATFORMS

(71) Applicant: Capital One Services, LLC, McLean, VA (US)

(72) Inventor: Mackenzie Sweeney, Bristow, VA (US)

(73) Assignee: Capital One Services, LLC, McLean, VA (US)

( * ) Notice: Subject to any disclaimer, the term of this patent is extended or adjusted under 35 U.S.C. 154(b) by 139 days.

(21) Appl. No.: 17/557,269

(22) Filed: Dec. 21, 2021

(65) Prior Publication Data
US 2023/0195607 A1    Jun. 22, 2023

(51) Int. Cl.
G06F 9/44       (2018.01)
G06F 11/36      (2006.01)
G06F 11/30      (2006.01)

(52) U.S. Cl.
CPC ...... *G06F 11/3688* (2013.01); *G06F 11/3006* (2013.01); *G06F 11/3051* (2013.01); *G06F 11/3684* (2013.01); *G06F 11/3692* (2013.01)

(58) Field of Classification Search
None
See application file for complete search history.

(56) References Cited

U.S. PATENT DOCUMENTS

| | | | |
|---|---|---|---|
| 9,824,001 B2* | 11/2017 | Bhattacharya | G06F 11/3688 |
| 2011/0178769 A1* | 7/2011 | Hunt | G06Q 30/02 |
| | | | 702/182 |
| 2015/0363711 A1* | 12/2015 | Raman | G06Q 10/063 |
| | | | 705/7.11 |
| 2019/0295105 A1* | 9/2019 | Sharma | G06F 8/77 |
| 2021/0232473 A1* | 7/2021 | Laskawiec | G06F 11/3419 |

OTHER PUBLICATIONS

Nov. 2019, Susan Athey et al. "The Surrogate Index: Combining Short-Term Proxies to Estimate Long-Term Treatment Effects More Rapidly and Precisely."

* cited by examiner

*Primary Examiner* — Qamrun Nahar
(74) *Attorney, Agent, or Firm* — Banner & Witcoff, Ltd.

(57) ABSTRACT

Methods and systems disclosed herein describe an experimentation platform that identifies one or more proxy metrics for testing a configuration and/or new design of a product. The experimentation platform may receive an input identifying one or more configurations, components, and/or products to test and/or optimize. The experimentation platform may identify one or more performance metrics used to test and/or optimize the one or more configurations, components, and/or products. Based on the one or more identified performance metrics, the experimentation platform may identify one or more proxy metrics to represent the one or more performance metrics. The one or more identified proxy metrics may be one or more engagement metrics or a combination of engagement metrics. The experimentation platform may then use the one or more proxy metrics to analyze the one or more configurations, components, and/or products and recommend a configuration, component, and/or product for deployment.

20 Claims, 6 Drawing Sheets

SYSTEM FOR AUTOMATIC IDENTIFICATION AND SELECTION OF OPTIMIZATION METRICS AND ACCOMPANYING MODELS IN EXPERIMENTATION PLATFORMS

FIELD OF USE

Aspects of the disclosure relate generally to machine learning methods and more specifically to identifying relationships between engagement metrics and one or more performance metrics.

BACKGROUND

Large-scale experimentation platforms allow enterprises to test and/or optimize products. Configuring an experiment to test and/or optimize the products comprises selecting a metric and a methodology for testing the digital and/or physical product. However, due to time-limitations, experimentation platforms are restricted on the types of metrics that can be tested. Accordingly, there is a need to test products with respect to performance metrics and/or key performance indicators in a short amount of time.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Systems, apparatuses, and methods are described for an experimentation platform that selects a metric and/or a methodology for testing a digital and/or physical product. The experimentation platform may receive a request to optimize a performance of a product. The experimentation platform may then determine a performance metric associated with optimizing the performance of the product. The experimentation platform may also determine one or more engagement metrics associated with the product. Based on the one or more engagement metrics and using a machine learning model, the experimentation platform may generate one or more proxy metrics representative of the performance metric. The one or more proxy metrics may then be ranked. Based on the ranking, the experimentation platform may determine a first proxy metric to represent the performance metric. The experimentation platform may then receive user-interaction data for a plurality of test configurations of the product. Based on the user-interaction data, the experimentation platform may determine performance scores for each of the plurality of test configurations of the product. The performance scores may then be outputted for each of the plurality of test configurations of the product. The experimentation platform may then receive a selection of a configuration from the plurality of test configurations of the product and configure the product according to the selected configuration. These features, along with many others, are discussed in greater detail below.

The techniques described herein allow an experimentation platform reduces the time to test performance metrics (e.g., key performance indicators). Accordingly, the techniques described herein improve experimentation platforms by reducing the amount of time and the number of resources needed to test new products with respect to performance metrics.

BRIEF DESCRIPTION OF THE DRAWINGS

The present disclosure is described by way of example and not limited in the accompanying figures in which like reference numerals indicate similar elements.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to an experimentation platform that selects a metric and/or a methodology for testing a product. The experimentation platform may comprise a graphical user interface (GUI), or management console, to configure, launch, monitor, and/or conclude experiments. Additionally, the experimentation platform may comprise a statistical engine configured to design and/or analyze the experiment. The experimentation platform may also comprise instrumentation in the product being tested and/or optimized. Additionally or alternatively, the experimentation platform may comprise targeting engine (e.g., routing engine) configured to divide users of the product into experiment variants (e.g., control or treatment). Finally, the experimentation platform may comprise a metrics library.

For the purposes of this disclosure, metrics may fall into one of two categories: engagement metrics and performance metrics. Engagement metrics may be immediate, or near real-time, user interactions and/or responses, such as button clicks, time spent using a product, etc. Performance metrics may be business metrics. For example, performance metrics may determine a customer conversion event, such as a purchase, or a customer lifetime value. Performance metrics may also be referred to as key performance indicators.

Metrics may be stored in a metrics library. The metrics library may automatically identify new metrics and/or rating metrics in terms of the metrics suitability as proxy metrics. The metrics library may store one or more inputs and/or response data sources for each product. In addition to the one or more inputs and/or response data sources, the metrics library may store registered schemas, such as fields, field types, semantic descriptions, etc. Additionally, the metrics library may comprise a database that stores historical data collected, for example, from experiments, as well as product usage.

The metrics library may also generate new proxy metrics. In this regard, the metrics library may generate a pool of candidate metrics for a new proxy metric. The pool of candidates may be based on one or more of raw fields, negations of raw fields, differences of two fields, ratios of two fields, similar combinations of a plurality of fields, and the like. The search space may be limited by the computational resources available. Additionally, semantic information from the schema may use Natural Language Processing (NLP) to filter and/or prioritize candidate metrics from the pool of candidate metrics.

Once the pool of candidate metrics has been generated, the metrics library may rate the suitability of the pool of candidate metrics. Additionally or alternatively, the metric library may also rate the suitability of existing metrics. In this regard, a correlation model, or a metric correlation model, may be used to rate the pool of candidate metrics. The pool of candidate metrics and/or the existing metrics may be rated on a scale of zero (0) to one (1) (i.e., [0,1]). The ratings may be based on causal inference applied to historical data that includes the candidate metric field(s) and the target performance metric field(s). The causal inference may use structural causal modeling (SCM) and other econometric methods, such as instrumental variables and surrogate indices. After each of the pool of candidate metrics and/or existing metrics is rated, the pool of candidate metrics and/or existing metrics may be ranked. Any metric that fails to satisfy a threshold (e.g., 0.5) may be discarded. Additionally or alternatively, metrics that fail to satisfy the threshold may be refined over time via additional experimentation. Metrics that satisfy the threshold may be added to the metrics library as proxy metrics. Proxy metrics that exist in the metrics library may also be refined, for example, using causal interference and machine learning techniques applied to newly acquired experimental data.

Once one or more proxy metrics are generated and stored in the metrics library, a statistical engine (e.g., a response modeling component of the statistical engine) may select a suitable response model. The statistical engine may identify a suitable model for a new metric by learning from historical patterns of performance metrics for similar metrics from the metrics library. The statistical engine may identify the suitable model without user input. Additionally, the statistical engine may consider similar data types, suitability ratings, performance metrics, etc. Additionally, the statistical engine may refine the model for a metric over time. To refine the metric, the statistical engine may learn from repeated experiments over time. Additionally or alternatively, the statistical engine may refine the metric based on observational data. Response models may be generated from historical data and tested using an automated machine learning process, such as hyperparameter search, goodness of fit tests, model expansion, model contraction, Bayesian model averaging, etc. A response model may estimate the selected metric for each test configuration. For instance, if the proxy metric selected is the click-through rate (CTR), the response model may estimate the CTR for each test configuration based on user interactions with the product. By using these automated machine learning process, the response model may evolve to be more effective across different experiments.

After the response model has been selected, the experimentation platform may use several methodologies to determine a methodology for conducting the experiment. The methodology may be selected from a library of regression models, such as linear and logistic regression, neural networks, decision trees, and the like. The experiment may identify a set of predictors and/or model parameters that identify the relationship between the proxy metric and the product.

Figure 1:
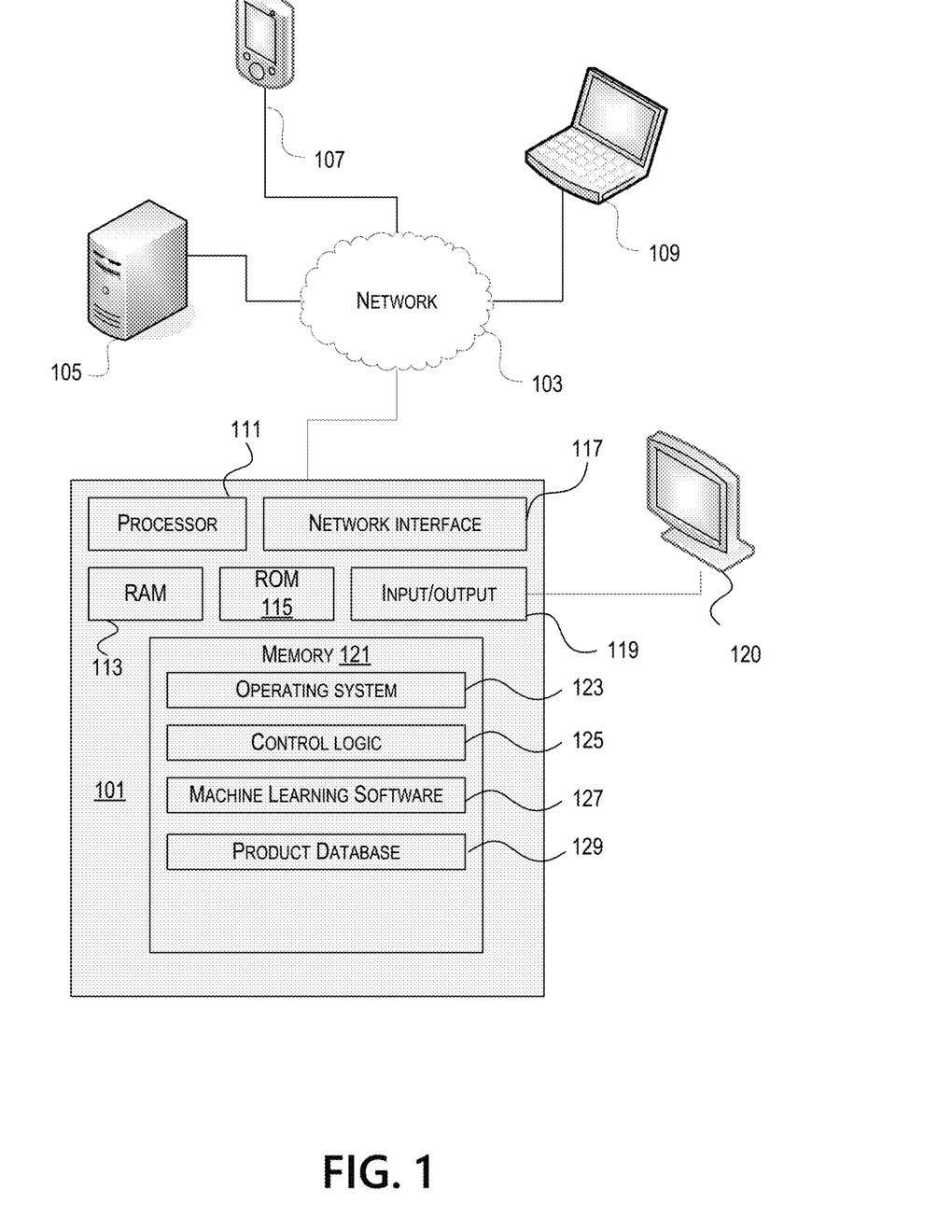
FIG. 1 shows an example of a system in which one or more aspects described herein may be implemented.

FIG. 1 shows a system 100. The system 100 may include a plurality of devices including a computing device 101, a plurality of client devices (e.g., mobile device 107, computing device 109), and/or third-party data server(s) 105 in communication via a network 103. The computing device 101 may be used to implement one or more illustrative aspects discussed herein. For example, the computing device 101 may, in some embodiments, implement one or more aspects of the disclosure by reading and/or executing instructions and performing one or more actions based on the instructions. In some embodiments, the computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device. Moreover, it will be appreciated that the network connections shown are illustrative and any means of establishing a communications link between the devices may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies.

The computing device 101 may, in some embodiments, operate in a standalone environment. In others, the computing device 101 may operate in a networked environment. As shown in FIG. 1, various network nodes or devices 105 (e.g., one or more third party servers), 107 (e.g., one or more mobile devices), 109 (e.g., one or more laptop and/or computing devices) may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations required by one or more applications stored on the computing device 101. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein. Furthermore, memory 121 may store various other databases and applications depending on the particular use. Control logic 125 may be incorporated in and/or may comprise a linking engine that updates, receives, and/or associates various information stored in the memory 121. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, devices 105, 107, 109 and others may operate in concert to provide parallel computing features in support of the operation of control logic 125, machine learning software 127, and/or a product database 129.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a mark-up language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Figure 2:
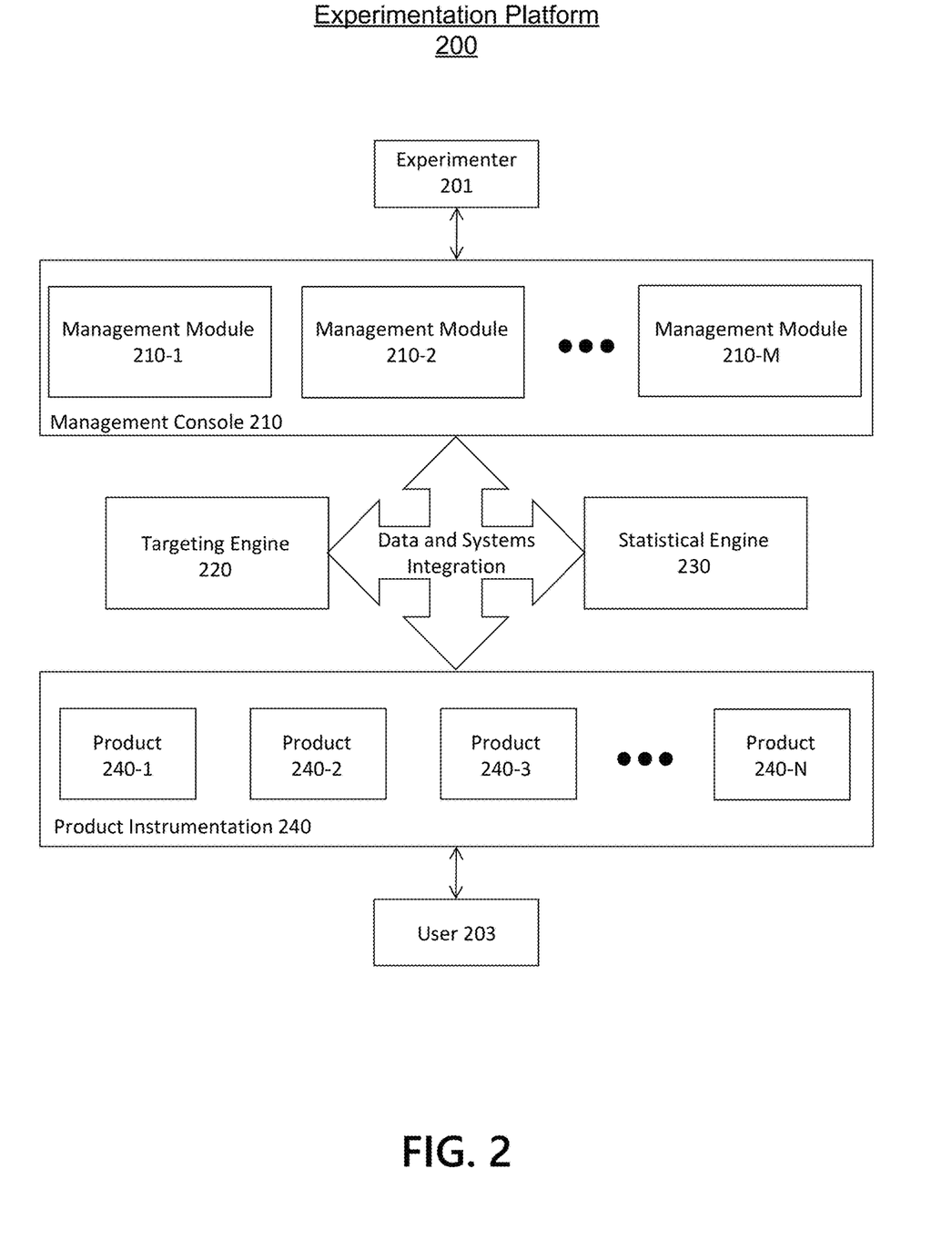
FIG. 2 shows an example experimentation platform in accordance with one or more aspects of the disclosure.

Although various components of the computing device 101 are described separately, functionality of the various components may be combined and/or performed by a single component and/or multiple computing devices in communication without departing from the invention FIG. 2 shows an example product experimentation platform 200 comprising one or more components. For example, the experimentation platform 200 may comprise a product instrumentation 240 component comprising one or more products 240-1, 240-2, . . . , 240-N (collectively "products 240"; generically, "product 240"). A product 240 may comprise one or more applications such as a web-site, a call center application, a mobile application, an email application and/or a short-message-service application, and/or a model development environment. A user 203 (e.g., a customer of, an employee of, or other person with a relationship to one or more of an enterprise company, banking institution, financial institution, or other type of commercial institution) may interact with one or more of the products 240, which may be configured to produce performance data based on the user-interaction. The one or more products 240 may also be configured to send the performance data to (and/or receive additional data from) one or more other components of the product experimentation platform 200. Moreover, data may be exchanged between any two components of the experimentation platform 200 via a data and systems integration module (e.g., ethernet, one or more modems, a wireless connection).

The product experimentation platform 200 may also or alternatively comprise a management console 210 comprising one or more management modules 210-1, 210-2, . . . , 210-M (collectively "modules 210"; generically, "module 210"). A module 210 may comprise one or more functions associated with product experimentation. For example, a module 210 may comprise a graphical-user-interface ("GUI") that may be interacted with by an experimenter 201. The experimenter may, for example, interact with the GUI of the module 210 to design a product experiment, launch a product experiment, edit an existing product experiment, and/or conclude a product experiment. The experimenter 201 may set up an experiment to test one or more test configurations of a product 240. As further discussed below, the product 240 may send performance data based on the test configurations, which may be used for determining an optimal test configuration of the product 240. Also or alternatively, the experimenter 201 may use the module 210 (or a different module 210) to monitor and/or analyze data associated with one or more existing or concluded product experiments. Also or alternatively, the experimenter 201 may use the module 210 (or a different module 210) to perform any other functions associated with product experimentation (e.g., to configure one or more of the products 240).

Furthermore, a module 210 may comprise a metrics library comprising one or more of engagement metrics (e.g., page-views, click-through-rate, user-interactions with a product, user-time spent on a product, other short-term performance indicators, etc.), performance metrics (e.g., return-on-investment, product profitability, product productivity, customer conversion event, customer purchases, customer lifetime value, other long-term performance indicators, etc.), and/or other types of key-performance indicators ("KPIs"). The experimenter 201 may run, via the module 210, an experiment to determine if a new configuration of a product 240 results in an improvement of, for example, a performance metric associated with the product 240. The improvement (or lack thereof) of the performance metric may be determined based on one or more engagement metrics that may be proxies for (i.e., may be representative of) the performance metric.

A product 240 may participate in an experiment by, for example, sending performance data to the management console 210. The performance data may be sent by the product 240 during or after the conclusion of an experiment.

Also or alternatively, the performance data may be sent by the product 240 during normal product usage (e.g., when the product 240 is not participating in an experiment). Moreover, the performance data may be formatted to comprise database schema such as fields, field types, field description, etc.

One or more engagement metrics may be determined based on performance data received from a product 240. For example, the determining of an engagement metric may comprise identifying one or more candidate metrics from the performance data. The one or more candidate metrics may be identified based on applying automated machine learning techniques (e.g., natural language processing machine learning) to the performance data. Additional automated machine learning techniques (e.g., Structural Causal Models) augmented with historical performance data (e.g., performance data stored in a product database of the management console 210) may be applied to determine a suitability of the one or more candidate metrics as proxies for the performance metric. An engagement metric may be selected from the one or more candidate metrics based on the determined suitability of each candidate metric. The selected engagement metric may be stored in the metrics library as a proxy for the performance metric.

An engagement metric of the metrics library may be paired with a model comprising a computational relationship between the engagement metric and a performance metric of a product 240. The model may be a correlation model or a metric correlation model. For example, one or more automated machine learning techniques (e.g., a linear regression model, a logistic regression model, a neural network model, a decision tree model, etc.) may be used to determine a suitable model to pair with the engagement metric. The one or more automated machine learning techniques may select a model based on identifying historical performance patterns (from performance data stored in a product database) of the product 240 associated with the engagement metric. After a model has been selected for the engagement metric, the model may be refined (e.g., continuously, periodically, or occasionally over time) to improve a predicted correlation (e.g., an output correlation computable via the response model) between the engagement metric and the performance metric.

For example, one or more automated machine learning techniques may be configured to continuously, periodically, or occasionally process additional performance data received from the product 240. Parameters and/or other numerical values associated with the model may be altered, adjusted, or refined based on processing the additional performance data. Thus, the model may be altered, adjusted, or refined over time to more accurately predict a correlation between the engagement metric and the performance metric. The model may provide, for the experimenter 201, information indicating a correlation between a test configuration of a product 240 and a performance metric of the product 240. Further details of determining engagement metrics and models are discussed below in connection with FIG. 3.

Furthermore, the product experimentation platform may comprise a targeting engine 220. The targeting engine 220 may perform time-sensitive operations associated with product experiments. For example, for an experiment comprising multiple test configurations of a product 240, the targeting engine 220 may sort each of a plurality of users into one of the multiple test configurations. The targeting engine 220 may ensure users are sorted into test configurations randomly (e.g., each test configuration may receive a similar demographic of users). Moreover, the targeting engine 220 may store performance data and/or experimental data (e.g., any additional data produced by a product 240 during an experiment that is not performance data) corresponding to the experiment configuration and the users associated with each test configuration of the product 240. The performance data and/or the experimental data may be used by the one or more automated machine learning algorithms during the selection and/or refinement of a response model for an engagement metric.

The product experimentation platform may also or alternatively comprise a statistical engine 230. The statistical engine 230 may perform functions associated with the one or more automated machine learning techniques. For example, the statistical engine 230 may analyze (e.g., using an automated machine learning algorithm) performance data to identify engagement metrics, performance metrics, and/or other KPIs associated with one or more experiments. Also or alternatively, the statistical engine 230 may make decisions regarding storing, deleting, or using performance data. For example, the statistical engine 230 may decide that performance data received from a product 240 is not relevant to an experiment associated with the product 240 and thus may be deleted. Alternatively, the statistical engine 230 may decide that performance data received from the product 240 should be stored in a product database of the management console 210 or stored in another database located in another component of the product experimentation platform 200. The statistical engine 230 may also perform functions associated with visualization of processed performance data (e.g., computational results of a response model). The processed performance data may be visualized by and interacted with (e.g., via a GUI interface of a management module 210) by the experimenter 201.

Figure 3:
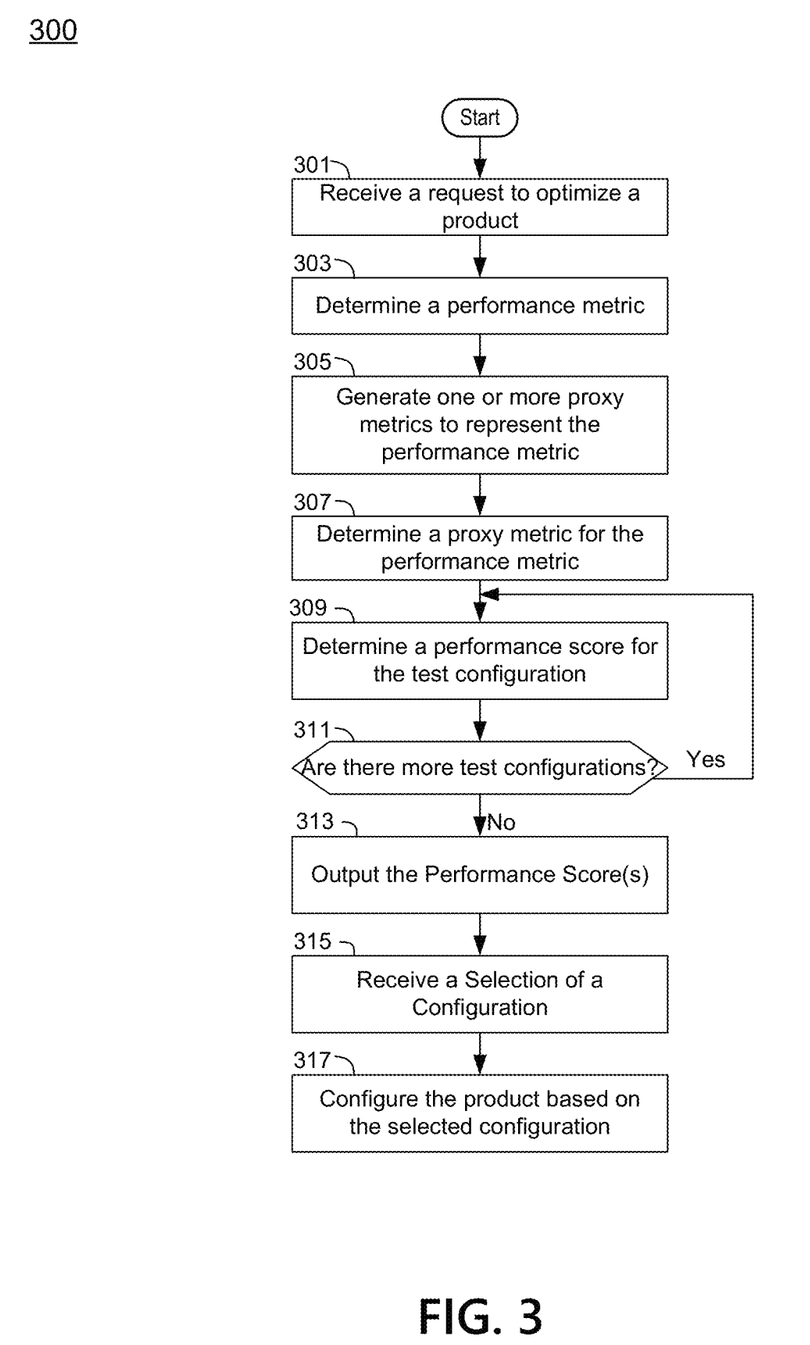
FIG. 3 is a flowchart showing an example method for configuring a product in accordance with one or more aspects of the disclosure.

As noted above, the present disclosure describes an experimentation platform that selects a metric and/or a methodology for testing a product. The testing may be to configure, or otherwise optimize, the product. FIG. 3 is a flowchart showing an example method for configuring a product in accordance with one or more aspects of the disclosure. Some or all of the steps of method 300 may be performed using one or more computing devices as described herein, including, for example, the computing device 101, third-party data server 105, mobile device 107, computing device 109, and/or experimentation platform 200. One or more steps of the example, method 300 may be rearranged, omitted, and/or otherwise modified, and/or other steps may be added.

In step 301, a computing device (e.g., the experimentation platform 200) may receive a request to test and/or optimize a performance of a product. "Experiment" and/or "experimentation" may be used interchangeably with test and/or optimize. The request may be received via a GUI (e.g., a management console). The request may identify the product. Additionally or alternatively, the request may define one or more parameters, including, for example, one or more metrics for the experiment and/or one or more models for the experiment. In some examples, the product may be a new configuration for an application and/or a new interface for the application. In alternative examples, the product may be a new website design. In still further examples, the product may be a new banner advertisement.

In step 303, the computing device may determine a performance metric associated with testing and/or optimizing the performance of the product. As noted above, the performance metric may be received in the request to test and/or optimize the performance of the product. Additionally or alternatively, the computing device may determine one or more performance metrics. As noted above, performance metrics may be business metrics, or key performance indicators. The computing device may determine one or more performance metrics based on the one or more parameters set forth in the request. For example, the request may test the performance of a new banner advertisement and, in particular, the conversion rate for the new banner advertisement. Accordingly, the computing device may determine that a performance metric showing the conversion rate may be a useful performance metric to track.

In step 305, the computing device may generate one or more proxy metrics representative of the performance metric. Generating one or more proxy metrics may be based on one or more historical proxy metrics, for example, stored in a metrics library. Additionally or alternatively, the one or more proxy metrics may comprise one or more engagement metrics. In some examples, the one or more proxy metrics may be based on one or more engagement metrics. The one or more engagement metrics may be determined using a natural language processing (NLP) algorithm (e.g., model). In this regard, the NLP algorithm (e.g. model) may be applied to data schemas to automatically identify appropriate candidate engagement metrics. The one or more engagement metrics may comprise at least one of: page-views, click-through rate (CTR), user-interactions with a product, user-time spent with a product, or the like. Additionally or alternatively, the computing device may use a machine learning model to determine the one or more engagement metrics. The more machine learning model may comprise a neural network, such as a convolutional neural network (CNN), a recurrent neural network, a recursive neural network, a long short-term memory (LSTM), a gated recurrent unit (GRU), an unsupervised pre-trained network, a space invariant artificial neural network, a generative adversarial network (GAN), or a consistent adversarial network (CAN), such as a cyclic generative adversarial network (C-GAN), a deep convolutional GAN (DC-GAN), GAN interpolation (GAN-INT), GAN-CLS, a cyclic-CAN (e.g., C-CAN), or any equivalent thereof. Additionally or alternatively, the machine learning model may comprise one or more decisions trees. The machine learning model may be trained using supervised learning, unsupervised learning, back propagation, transfer learning, stochastic gradient descent, learning rate decay, dropout, max pooling, batch normalization, long short-term memory, skip-gram, or any equivalent deep learning technique.

In step 307, the computing device may determine a proxy metric to represent the performance metric. After determining the one or more proxy metrics in step 305, the computing device may rank the one or more proxy metrics. The one or more proxy metrics may be ranked using a correlation model, or a metric correlation model. The correlation model, or the metric correlation model, may use structural causal modeling (SCM) and other econometric methods, such as instrumental variables and surrogate indices, to determine the ranking. Additionally or alternatively, the one or more candidate proxy metrics may be compared to a threshold. Any metric that fails to satisfy the threshold (e.g., 0.5) may be discarded, while metrics that fail to satisfy the threshold may be used to test the product. In some embodiments, one or more proxy metrics may be determined (e.g., selected) to represent the performance metric.

In step 309, the computing device may determine performance scores for the product. In this regard, the computing device may automatically select one or more response models to test the product. The one or more response models and the one or more proxy metrics may be used to test the product. In this regard, the product may have one or more test configurations that are being tested. The response model may be used to generate a performance score for each of the test configurations, using each of the one or more proxy metrics. Additionally or alternatively, the computing device may generate a performance score by receiving user-interaction data for each of the test configurations. In step 311, the computing device may determine whether any additional test configurations exist. If so, the method 300 proceeds to step 309 where a performance score may be generated for another test configuration. However, if there are no more test configurations, the method 300 proceeds to step 313.

In step 313, the computing device may output the performance scores for each of the plurality of test configurations of the product. Outputting the performance scores may include causing the performance scores for each of the plurality of test configurations to be displayed via a GUI (e.g., management console). In step 315, the computing device may receive a selection of a configuration from the plurality of test configurations of the product. The selection may be received via the GUI (e.g. management console). In some examples, the selection may be based on a highest performance score amongst the plurality of test configurations. In step 317, the computing device may configure the product according to the selected configuration. As noted above, configuring the product according to the selected configuration may comprise a new configuration for an application and/or a new interface for the application, a new website design, or displaying a new advertisement.

Figure 4:
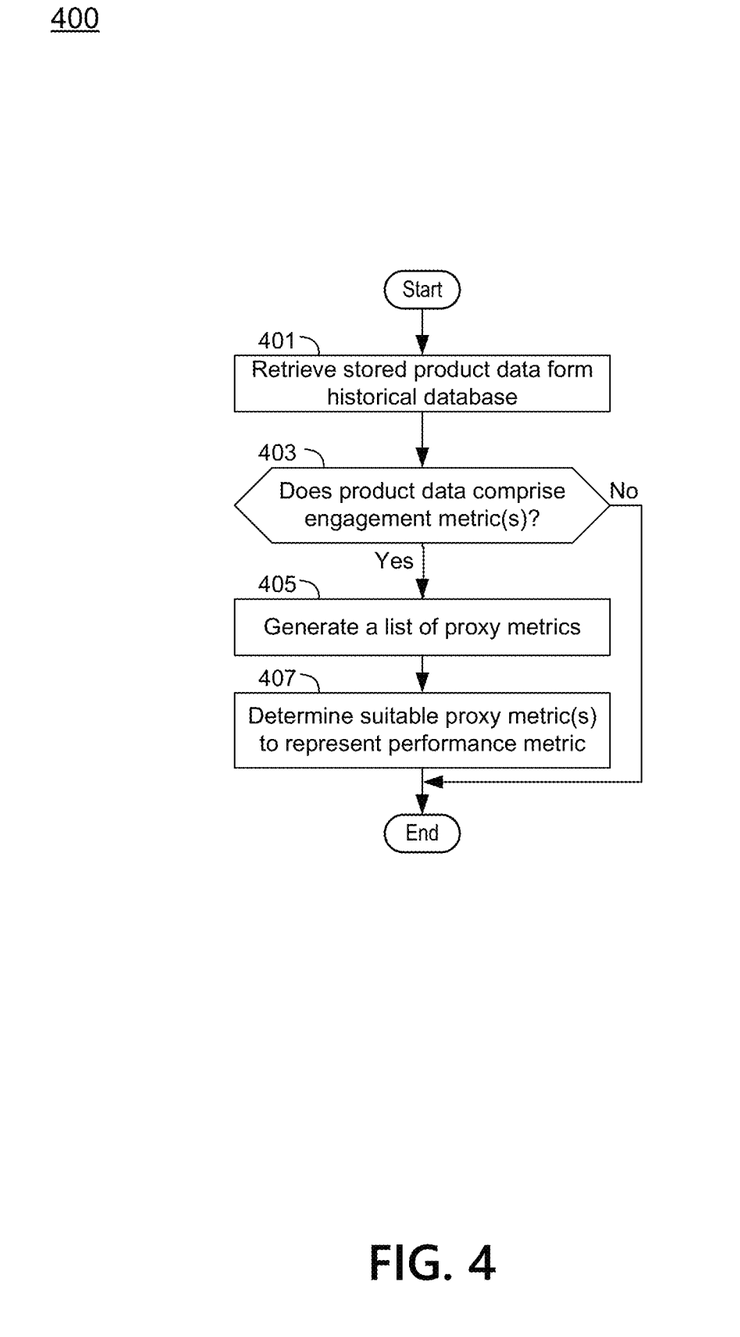
FIG. 4 is a flowchart showing an example method for determining a proxy metric in accordance with one or more aspects of the disclosure.

As noted above, a computing device (e.g., the experimentation platform 200) may generate one or more proxy metrics. The computing device may generate the one or more proxy metrics, for example, in response to receiving a performance metric to test for. FIG. 4 shows an example method for determining a proxy metric in accordance with one or more aspects of the disclosure. Some or all of the steps of method 400 may be performed using one or more computing devices as described herein, including, for example, the computing device 101, third-party data server 105, mobile device 107, computing device 109, and/or experimentation platform 200. One or more steps of the example, method 400 may be rearranged, omitted, and/or otherwise modified, and/or other steps may be added.

In step 401, a computing device may receive product data from a database. As noted above, the computing device may receive a request to test and/or optimize a product. The request may comprise product data, as well as a performance metric to test for. In response to the request, the computing device may query a database (e.g., the metrics library) to determine whether product data exists. In response, the database may provide the product data. In step 403, the computing device may determine whether the product data comprises one or more engagement metrics. The one or more engagement metrics may represent one or more historical proxies that were previously used to test the product and/or for the performance metric. In step 405, the computing device may generate a list of proxy metrics to represent the performance metric received in the request. In this regard, the list of proxy metrics may comprise one or more historical proxies. Additionally or alternatively, the list of proxy metrics may comprise one or more engagement metrics and/or a combination of engagement metrics. In step 407, the computing device may determine one or more proxy metrics to represent the performance metric. In some instances, the one or more proxy metrics may be displayed via a GUI (e.g., management console). The GUI may receive a selection of one or more proxy metrics to represent the performance metric. In other embodiments, the computing device may recommend one or more proxy metrics to represent the performance metric. In yet further embodiments, the computing device may select one or more proxy metrics to represent the performance metric.

Figure 5:
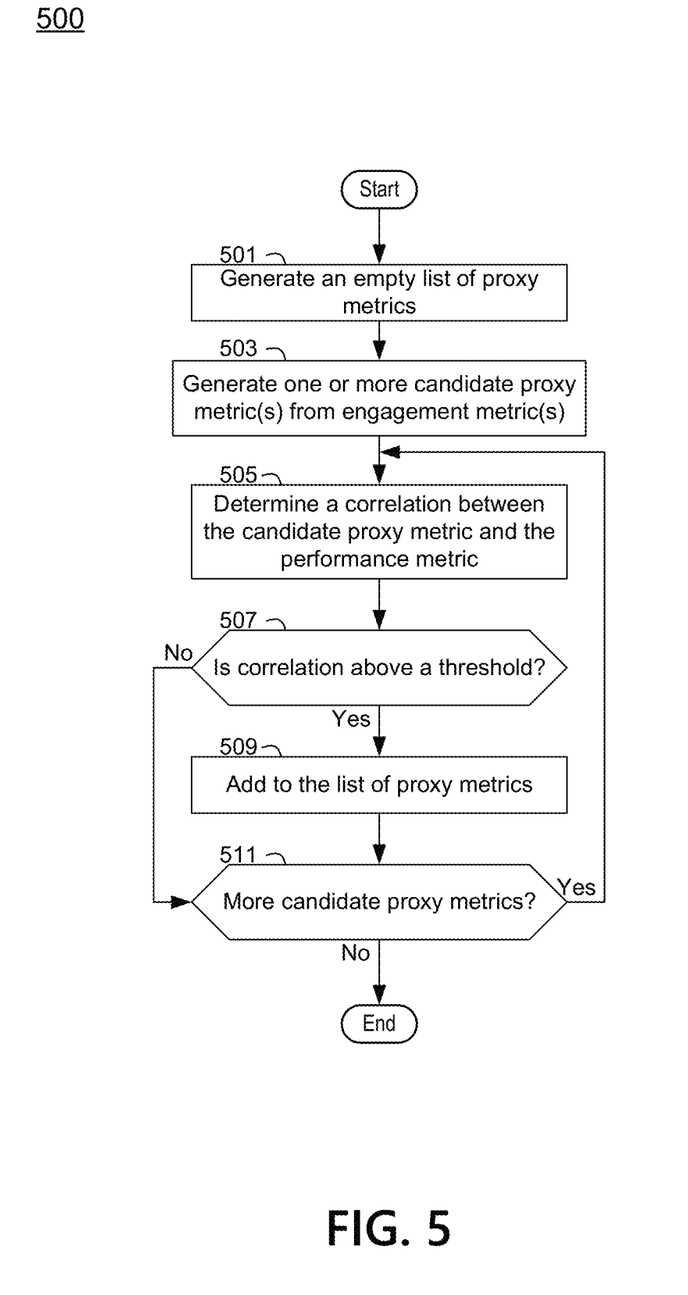
FIG. 5 is a flowchart showing an example method for generating proxy metrics in accordance with one or more aspects of the disclosure.

FIG. 5 shows another example method for generating proxy metrics in accordance with one or more aspects of the disclosure. Some or all of the steps of method 500 may be performed using one or more computing devices as described herein, including, for example, the computing device 101, third-party data server 105, mobile device 107, computing device 109, and/or experimentation platform 200. One or more steps of the example, method 500 may be rearranged, omitted, and/or otherwise modified, and/or other steps may be added.

In step 501, a computing device may generate an empty list of proxy metrics. The empty list of proxy metrics may be generated, for example, in response to receiving a request to test and/or optimize a product. In step 503, the computing device may generate a list of candidate proxy metrics from one or more engagement metrics. As described herein, one or more engagement metrics may be used as a proxy metric for a performance metric. The computing device may generate candidate proxy metrics, for example, based on historical proxy metrics, one or more engagement metrics, a combination of engagement metrics, etc. In step 505, the computing device may determine whether a correlation exists between each of the candidate proxy metrics and the performance metric received in the request to test and/or optimize the product. The correlation may be based on historical data and/or behavior learned via a correlation model, or a metric correlation model. In step 507, the computing device may determine whether the correlation between the proxy metric and the performance metric satisfies a threshold. If the correlation fails to satisfy the threshold, the method proceeds to step 511, where the computing device determines whether additional proxy metrics exists. If so, the method returns to step 505. If the correlation does satisfy the threshold, the computing device may add the candidate proxy metric to the list of proxy metrics in step 511. When the computing device determines that no candidate proxy metrics remain in step 511, the method 500 ends.

Figure 6:
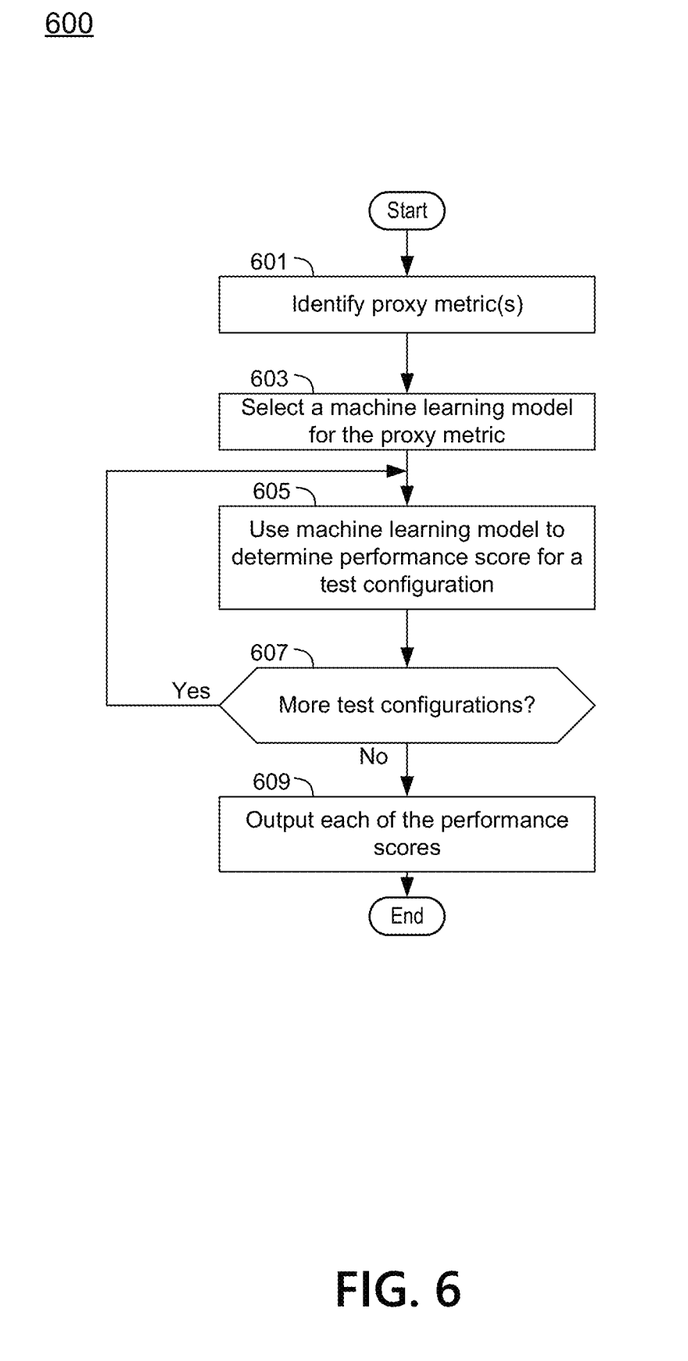
FIG. 6 is a flowchart showing an example method for determining performance scores in accordance with one or more aspects of the disclosure.

As noted above, the computing device may determine how each of a plurality of test configurations perform. Each test configuration may receive a performance score as part of the evaluation. FIG. 6 shows an example method for determining performance scores in accordance with one or more aspects of the disclosure. Some or all of the steps of method 600 may be performed using one or more computing devices as described herein, including, for example, the computing device 101, third-party data server 105, mobile device 107, computing device 109, and/or experimentation platform 200. One or more steps of the example, method 600 may be rearranged, omitted, and/or otherwise modified, and/or other steps may be added.

In step 601, the computing device may identify one or more proxy metrics to represent a performance metric. The one or more proxy metrics may be identified using any of the techniques described herein, including for example, using a correlation model or a metric correlation model. In step 603, the computing device may determine a response model for the proxy metric. In step 605, the computing device may use the response model and the proxy metric to determine a performance score for a test configuration. In step 607, the computing device may determine whether any more test configurations have yet to be scored. If so, the method 600 returns to step 605 to score another test configuration. If each of the test configurations have been scored, the process proceeds to step 609, where each of the performance scored for one or more test configurations are outputted.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

The invention claimed is:

1. A method comprising:
   receiving, by an experimentation platform executing on a computing device, a request to optimize a performance of a product;
   determining, by the experimentation platform, a performance metric associated with optimizing the performance of the product;
   determining, by the experimentation platform, one or more engagement metrics associated with the product;
   generating, by the experimentation platform, based on the one or more engagement metrics and using a machine learning model, one or more proxy metrics representative of the performance metric, wherein the machine learning model is configured to determine at least one of the one or more engagement metrics to represent the performance metric;
   ranking, by the experimentation platform, the one or more proxy metrics representative of the performance metric;
   determining, by the experimentation platform, based on the ranking, a first proxy metric, of the one or more proxy metrics, to represent the performance metric;
   receiving, by the experimentation platform, based on the first proxy metric, user-interaction data for a plurality of test configurations of the product;
   determining, by the experimentation platform and based on the user-interaction data, performance scores for each of the plurality of test configurations of the product; and
   outputting, by the experimentation platform, the performance scores for each of the plurality of test configurations of the product.

2. The method of claim 1, wherein the machine learning model is configured to determine a combination of the one or more engagement metrics to represent the performance metric.

3. The method of claim 1, further comprising:
   receiving a selection of a configuration with a highest performance score amongst the plurality of test configurations.

4. The method of claim 3, further comprising:
   configuring the product according to the selection of the configuration.

5. The method of claim 1, wherein the machine learning model comprises at least one of a linear regression model, a logistic regression model, a neural network model, or a decision tree model.

6. The method of claim 1, wherein the one or more engagement metrics comprise at least one of:
page-views;
click-through rate;
user-interactions with an instrumented product; or
user-time spent on an instrumented product.

7. The method of claim 1, further comprising:
receiving, from a database, one or more historical proxy metrics for the performance metric.

8. The method of claim 7, wherein the generating the one or more proxy metrics is further based on the one or more historical proxy metrics.

9. The method of claim 1, further comprising:
sending, to a database, the one or more proxy metrics to create a metrics library of proxy metrics.

10. The method of claim 1, wherein the ranking the one or more proxy metrics comprises ranking, using the machine learning model, the one or more proxy metrics.

11. The method of claim 1, wherein the determining the one or more engagement metrics associated with the product comprises determining, using a natural language processing algorithm, the one or more engagement metrics associated with the product.

12. The method of claim 1, wherein the determining the performance scores comprises determining, using the machine learning model, the performance scores.

13. A computing device comprising:
one or more processors; and
memory storing instructions that, when executed by the one or more processors, cause the computing device to:
receive, by an experimentation platform, a request to optimize a performance of a product;
determine, by the experimentation platform, a performance metric associated with optimizing the performance of the product;
determine, by the experimentation platform, one or more engagement metrics associated with the product;
generate, by the experimentation platform, based on the one or more engagement metrics and using a machine learning model, one or more proxy metrics representative of the performance metric, wherein the machine learning model is configured to determine at least one of the one or more engagement metrics that represent the performance metric;
rank, by the experimentation platform, the one or more proxy metrics representative of the performance metric;
determine, by the experimentation platform, based on the ranking, a first proxy metric, of the one or more proxy metrics, to represent the performance metric;
receive, by the experimentation platform, based on the first proxy metric, user-interaction data for a plurality of test configurations of the product;
determine, by the experimentation platform and based on the user-interaction data, performance scores for each of the plurality of test configurations of the product; and
output, by the experimentation platform, the performance scores for each of the plurality of test configurations of the product.

14. The computing device of claim 13, wherein the machine learning model is configured to determine a combination of the one or more engagement metrics to represent the performance metric.

15. The computing device of claim 13, wherein the instructions, when executed by the one or more processors, cause the computing device to:
receive a selection of a configuration from the plurality of test configurations; and
configure the product based on the selection of the configuration.

16. The computing device of claim 13, wherein the instructions, when executed by the one or more processors, cause the computing device to:
receive, from a database, one or more historical proxy metrics for the performance metric.

17. A non-transitory computer-readable medium comprising instructions that, when executed, cause a computing device to:
receive, by an experimentation platform, a request to optimize a performance of a product;
determine, by the experimentation platform, a performance metric associated with optimizing the performance of the product;
determine, by the experimentation platform, one or more engagement metrics associated with the product;
generate, by the experimentation platform, based on the one or more engagement metrics and using a machine learning model, one or more proxy metrics representative of the performance metric, wherein the machine learning model is configured to determine at least one of the one or more engagement metrics that represent the performance metric;
rank, by the experimentation platform, the one or more proxy metrics representative of the performance metric;
determine, by the experimentation platform, based on the ranking, a first proxy metric, of the one or more proxy metrics, to represent the performance metric;
receive, by the experimentation platform, based on the first proxy metric, user-interaction data for a plurality of test configurations of the product;
determine, by the experimentation platform and based on the user-interaction data, performance scores for each of the plurality of test configurations of the product; and
output, by the experimentation platform, the performance scores for each of the plurality of test configurations of the product.

18. The non-transitory computer-readable medium of claim 17, wherein the machine learning model is configured to determine a combination of the one or more engagement metrics to represent the performance metric.

19. The non-transitory computer-readable medium of claim 17, wherein the instructions, when executed, cause the computing device to:
receive a selection of a configuration from the plurality of test configurations; and
configure the product based on the selection of the configuration.

20. The non-transitory computer-readable medium of claim 17, wherein the instructions, when executed, cause the computing device to:
receive, from a database, one or more historical proxy metrics for the performance metric.

* * * * *